(12) United States Patent
Swanepoel

(10) Patent No.: US 10,828,648 B2
(45) Date of Patent: Nov. 10, 2020

(54) FLOTATION CELL

(71) Applicant: Johannes Gideon Andries Swanepoel, Brakpan (ZA)

(72) Inventor: Johannes Gideon Andries Swanepoel, Brakpan (ZA)

( * ) Notice: Subject to any disclaimer, the term of this patent is extended or adjusted under 35 U.S.C. 154(b) by 323 days.

(21) Appl. No.: 15/558,158

(22) PCT Filed: Feb. 11, 2016

(86) PCT No.: PCT/IB2016/050718
§ 371 (c)(1),
(2) Date: Sep. 13, 2017

(87) PCT Pub. No.: WO2016/147064
PCT Pub. Date: Sep. 22, 2016

(65) Prior Publication Data
US 2018/0272360 A1 Sep. 27, 2018

(30) Foreign Application Priority Data
Mar. 16, 2015 (ZA) .................. 2015/01792

(51) Int. Cl.
| | | |
|---|---|---|
| *B03D 1/14* | (2006.01) | |
| *B03D 1/02* | (2006.01) | |
| *B03D 1/22* | (2006.01) | |
| *B01D 21/08* | (2006.01) | |
| *B01D 21/24* | (2006.01) | |

(52) U.S. Cl.
CPC ........... *B03D 1/1468* (2013.01); *B03D 1/028* (2013.01); *B03D 1/22* (2013.01); *B01D 21/08* (2013.01); *B01D 21/2433* (2013.01)

(58) Field of Classification Search
CPC ........ B03D 1/028; B03D 1/22; B03D 1/1468; B01D 21/08; B01D 21/2433; C02F 1/24
See application file for complete search history.

(56) References Cited

U.S. PATENT DOCUMENTS

| | | |
|---|---|---|
| 1,737,624 A | 12/1926 | Thomson |
| 2,423,456 A | 4/1943 | Logue |
| 2,443,592 A | 5/1945 | Booth |

(Continued)

OTHER PUBLICATIONS

International Search Report and Written Opinion, PCT/IB16/50718, filed Feb. 11, 2016, 11 pages.

*Primary Examiner* — Charles A Fox
*Assistant Examiner* — Kalyanavenkateshware Kumar
(74) *Attorney, Agent, or Firm* — Brownstein Hyatt Farber Schreck, LLP

(57) ABSTRACT

THIS invention relates to froth flotation, and more specifically to a froth flotation cell and an internal sand removal arrangement for the froth flotation cell. The froth flotation cell included a tank having an operatively lower zone, an intermediate zone and an operatively upper zone, and a central dispersing chamber disposed in the intermediate zone of the tank. A slurry inlet is located in the operatively lower zone of the tank, and a slurry outlet conduit extends from the operatively upper zone of the tank towards a slurry outlet. The froth flotation cell is characterised in that the operatively lower zone is also selectively in flow communication with the slurry outlet of the tank, in order for slurry located in the operatively lower zone of the tank selectively to be displaceable into the slurry outlet.

17 Claims, 2 Drawing Sheets

(56) References Cited

U.S. PATENT DOCUMENTS

| | | |
|---|---|---|
| 6,481,927 B2 | 11/2002 | Rhodes |
| 6,524,486 B2 | 2/2003 | Borodyanski et al. |
| 7,544,271 B1 * | 6/2009 | Seenivasan ............ D21B 1/327 209/170 |
| 2002/0079270 A1 | 6/2002 | Borodyanski et al. |
| 2008/0251427 A1 * | 10/2008 | Mankosa ................ B03D 1/22 209/164 |
| 2010/0193408 A1 * | 8/2010 | Jameson ................ B03D 1/24 209/164 |
| 2017/0312759 A1 * | 11/2017 | Steinwender ........... B02C 17/16 |

* cited by examiner

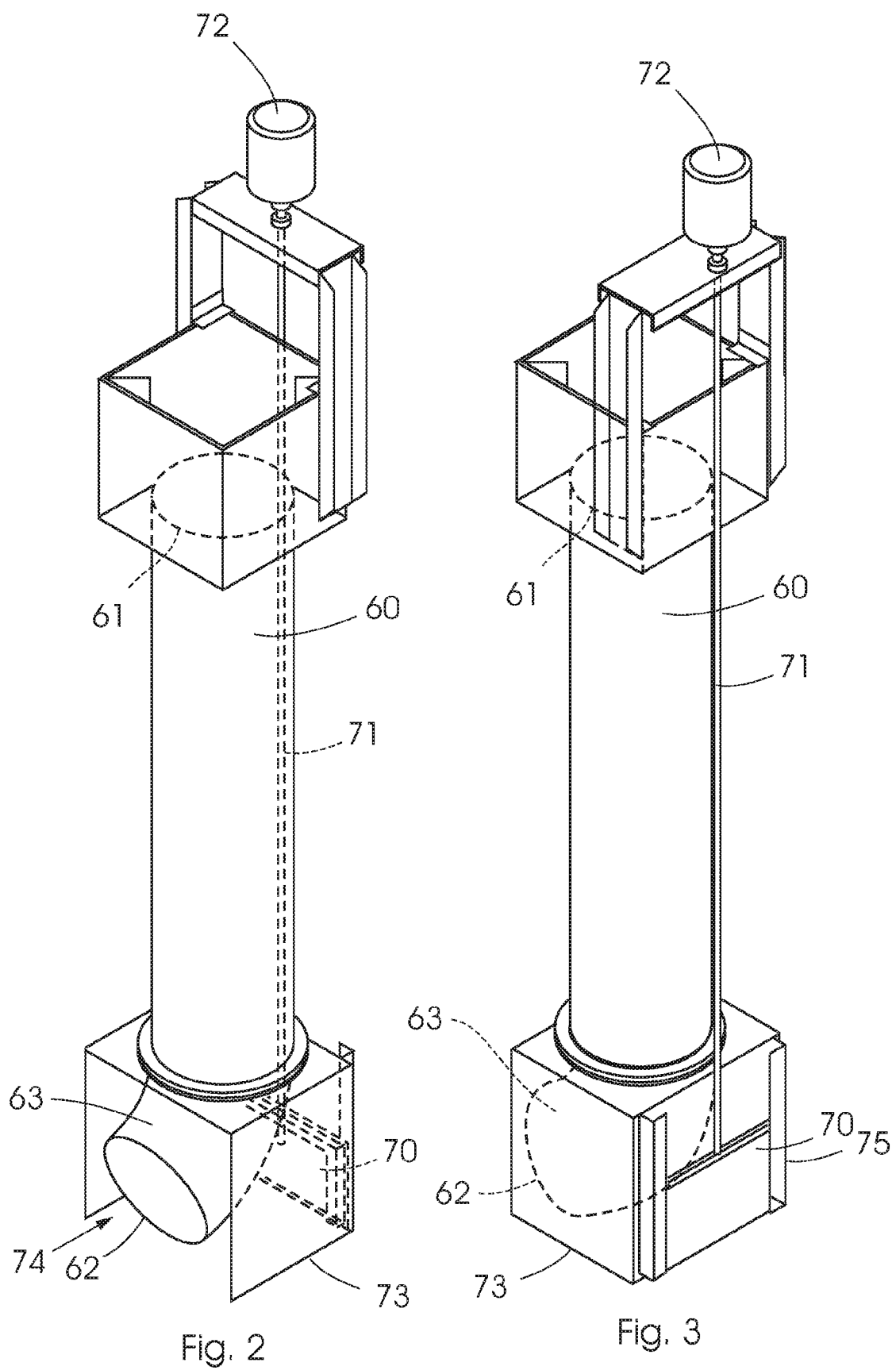

FLOTATION CELL

CROSS-REFERENCE TO RELATED APPLICATION

This application is a 35 U.S.C. 371 application of PCT/IB2016/050718, filed Feb. 11, 2016, and titled "Flotation Cell," which claims priority to South African Patent Application No. 2015/01792, filed Mar. 16, 2015, and titled "Flotation Cell," the contents of which are incorporated herein by reference in their entireties.

BACKGROUND OF THE INVENTION

THIS invention relates to froth flotation, and more specifically to a froth flotation cell and an internal sand removal arrangement for the froth flotation cell.

Froth flotation cells are used, for example, in the metallurgical and mining field to separate valuable materials from slurry. Conventional froth flotation cells include a tank for receiving the slurry, which is typically introduced into the bottom of the tank. A rotor, which is driven by an electric motor, agitates the slurry in the tank and draws it upwards through a draft tube extending from a bottom of the tank. Separation of the slurry occurs by introducing air bubbles into the slurry so as to generate a froth that rises to the surface and which is then removed from the cell by overflowing into a launder. Certain components within the slurry are selectively carried with the froth, and thus are subsequently separated by flotation from the rest of the slurry.

A problem associated with conventional flotation cells is that sand and other sediments tend to accumulate in the bottom of the tank over a period of time. As the sand volume increases, the effective fluid volume of the flotation cell decreases, which is obviously not desirable. The sand level can also increase to a level where it starts to interfere with the introduction of slurry through the inlet and draft tube of the flotation cell.

At present, regular maintenance is required to remove the sand, resulting in downtime, which in turn translates into production losses.

It is an object of the present invention to provide a froth flotation cell which at least partially alleviates the abovementioned problem.

It is a further object of the invention to provide a new and inventive froth flotation cell, which will be a useful alternative to those known in the art.

It is an object of the present invention to provide a sand removal arrangement, which at least partially alleviates the abovementioned problem.

It is a further object of the invention to provide a new and inventive sand removal arrangement which will be a useful alternative to that known in the art.

SUMMARY OF THE INVENTION

According to the invention there is provided a froth flotation cell including:
- a tank having an operatively lower zone, an intermediate zone and an operatively upper zone;
- a central dispersing chamber disposed in the intermediate zone of the tank;
- a slurry inlet located in the operatively lower zone of the tank; and
- a slurry outlet conduit extending from the operatively upper zone of the tank and being in flow communication with a slurry outlet, in order for slurry located in the operatively upper zone of the tank in use to be displaceable from the tank via the slurry outlet conduit;

characterised in that the operatively lower zone of the tank is also selectively in flow communication with the slurry outlet of the tank, in order for slurry located in the operatively lower zone of the tank selectively to be displaceable towards the slurry outlet.

There is provided for the slurry outlet conduit to extend downwardly along the height of the tank, and for a bottom part of the slurry outlet conduit to be in flow communication with the slurry outlet and also with the operatively lower zone of the tank.

The inlet of the slurry outlet conduit may be located at the operatively upper zone of the tank, and the outlet conduit may be configured in order for the inlet of the outlet conduit to act as a tank overflow or launder.

The height of the inlet may be adjustable in order for the effective take off level of the outlet conduit to be adjustable.

The height of the inlet of the outlet conduit may be increased by securing one or more extension rings to the end of the inlet.

A bent section may be provided towards the bottom end of the outlet conduit. The bent section may be bent at an angle of between 20 and 40 degrees, preferably 30 to 35 degrees, more preferably about 33 degrees.

The bent section may define the outlet of the slurry outlet conduit.

There is provided for the slurry outlet conduit to be in flow communication with an outlet chamber, and for the outlet chamber in turn to be in flow communication with the operatively lower zone of the tank.

The outlet chamber may include an outlet opening defining the slurry outlet through which the slurry received via the slurry outlet conduit is conveyed to a further conduit that is in flow communication with an adjacent flotation cell.

The outlet chamber may also include an inlet opening that is in flow communication with the operatively lower zone of the tank.

A closure may be provided for selectively closing the inlet opening of the outlet chamber.

The closure is preferably in the form of a sliding gate.

The sliding gate may be displaced by way of displacement means, such as an electric motor.

The flotation cell may also include a level detection means.

The displacement means may be actuated to open the closure in response to a predetermined high-level signal received from the level detection means.

The displacement means may be actuated to close the closure in response to a predetermined low-level signal received from the level detection means.

According to a further aspect of the invention there is provided a method of operating a froth flotation cell that includes a slurry outlet conduit extending from the operatively upper zone of the tank, wherein the slurry outlet conduit is also selectively in flow communication with an operatively lower zone of the tank, in order for slurry located in the operatively lower zone of the tank selectively to be displaceable into the slurry outlet conduit, and a displaceable closure for selectively allowing and preventing flow from the operatively lower zone of the tank to the slurry outlet conduit, the method including the steps of:
- opening the closure in response to a predetermined high-level signal received from a level detection means; and
- closing the closure in response to a predetermined low-level signal received from the level detection means.

There is also, or alternatively provided for the method to include the step of continuously controlling the closure based on a predetermined desired level set point. In such case the closure will be used as a continuous control valve forming part of a feedback loop.

BRIEF DESCRIPTION OF THE DRAWINGS

The invention will now be described in more detail, by way of example only, with reference to the accompanying drawings in which:

FIG. 2 is a perspective view of the sand gate arrangement used in the flotation cell of FIG. 1; and FIG. 3 is another perspective view of the sand gate arrangement shown in FIG. 2.

DETAILED DESCRIPTION OF THE INVENTION

Figure 1:
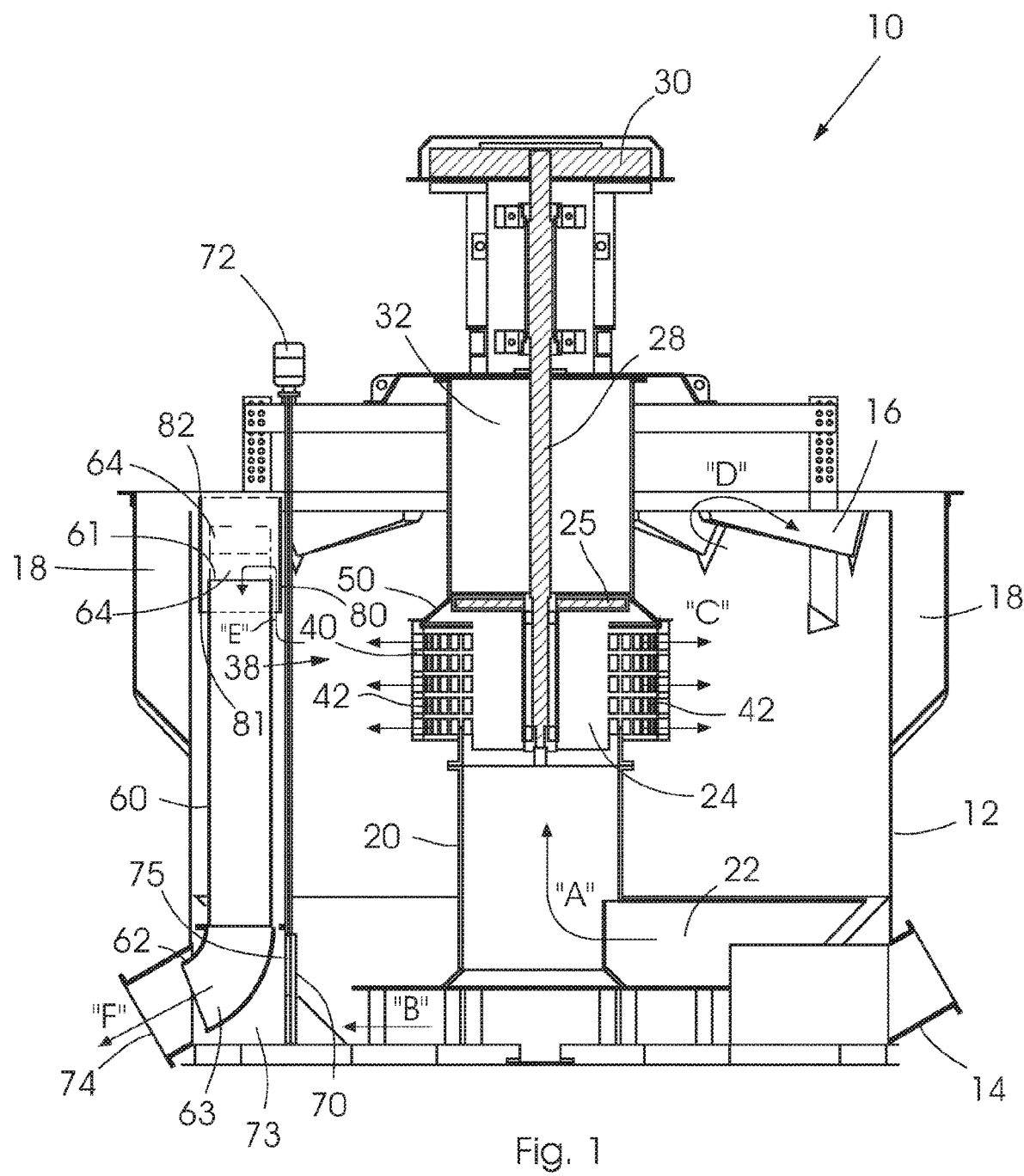
FIG. 1 shows a vertical cross-sectional view of a froth flotation cell incorporating a sand gate according to one embodiment of the present invention.

Referring to the figure, a non-limiting example of a flotation cell in accordance with the invention is indicated by reference numeral 10. Typically, the cell 10 is connected to other similar cells (not shown) in series. As can be seen, the cell 10 includes a tank 12 which has an inlet 14 in a lower region thereof for allowing slurry into the tank. A first or product outlet 16 at an upper end of the tank allows froth generated in the tank 12 to be discharged into a launder in the form of an annular chamber 18, and a second or slurry outlet 60 in a lower region of the tank allows slurry to be discharged to the tank of an adjacent cell (not illustrated).

A draft tube 20 extends vertically upwardly from a horizontally extending feed chute 22. The feed chute 22 is located immediately adjacent the inlet 14 in order for slurry that enters the tank through the inlet 14 to be directed directly into the inlet of the feed chute 22, from where it is then conveyed to a rotor/disperser area as indicated by arrow A. This arrangement results in the rotor 24 and impeller 25 to receive slurry (from the draft tube) at a constant, steady, even and required rate. This is achieved due to the fact that excessive slurry feed can be directed downwards to the bottom of the tank instead of "the normal flow" upwards to the rotor/disperser area. Stability to the rotor is therefore achieved at any given time. Should excessive slurry feed conditions subside, normal draft conditions to the rotor will continue.

A rotor 24 agitates the slurry in the tank and draws it upwardly through the draft tube 20. The rotor 24 is driven by an electric motor (not shown) which is connected to the rotor via a drive shaft 28 and, for example, a belt and pulley arrangement, designated generally by the reference numeral 30. An aerating impeller 25 is located immediately above the rotor 24, and is mounted on the same drive shaft 28. A standpipe 32 (also known as a vortex chamber), in the form of an annular tubular section, is suspended from a support arrangement (not illustrated) and depends below the surface of the slurry, as shown. Air is allowed into the standpipe through an air-inlet line (not shown) and a control valve (not shown) as is known in the art. The impeller 25 draws air from the standpipe, and disperses the air into the slurry drawn up through the draft tube 20 by the rotor 24.

A disperser 38 is provided at an opposite, lower end of the standpipe 32. The disperser 38 includes a generally annular disperser body 40 having a plurality of dispersing apertures 42. The dispersing apertures 42 direct air and slurry flowing out of the disperser 38 in an outwardly and potentially also downwardly direction from the disperser, as indicated by arrow C.

In practice, separation occurs by introducing air into the slurry so as to generate a froth which rises to the surface of the slurry and is removed by overflow into the chamber 18, as indicated by arrow D. Some components present in the slurry, such as in one example phosphorus, are selectively carried with the froth, and are then removed from the cell and subsequently separated by flotation from the rest of the slurry.

With reference again to the figures, and in particular FIG. 1, air is introduced into the slurry by generating a vortex within the standpipe 32 as a result of rotation of the rotor 24 within the slurry. The vortex creates a vacuum in the standpipe 32 above the slurry which draws ambient air into the standpipe through the air-inlet line, and the air is then drawn into the slurry to create air bubbles as the slurry is forced through the disperser 38 by the rotor 24, as well as the aerating impeller 25.

The second outlet 60 of the tank allows slurry to be discharged from the tank, and to be fed into an adjacent flotation cell (not shown) as indicated by arrow E. The second outlet 60 is in the form of an outlet conduit that extends substantially the entire height of the tank 12. The conduit 60 is located inside the tank 12, and includes a first open end 61 that is located at an operatively upper zone of the tank 12, and a second open end 62 which located at the bottom of the tank 12. The first open end 61 is surrounded by a froth barrier 80, which in this example is in the form of a square or rectangular sleeve extending about the first open end 61 of the conduit 60. The sleeve 80 has an operatively lower end 81 that extends operatively downwardly below the first open end 61 of the conduit. In use, the lower end 81 will be located below a froth layer inside the cell, so as to ensure that product carrying froth does not escape via the second outlet 60. An upper end 82 of the froth barrier 80 extends upwardly beyond the first open end 61, and in use protrudes above the upper level of the froth layer inside the cell, thus preventing forth from entering the top second outlet 60 from above. The net effect of this arrangement is that the elevation of the first open end 61 will determine the level of the slurry in the cell, and this level will be maintained without losing froth through the second outlet 60. The level can furthermore also be adjusted by adding extension rings 64 onto the conduit 60 so as to increase the elevation of the open end 61.

The outlet conduit 60 in configured in a vertical position, and the first open end 61 is aligned to be in line with the required slurry surface level in the tank 12. As mentioned above, the exact height of the first open end 61 can be adjusted by the addition or removal of extension rings 64 on the inlet end of the outlet conduit 60. From the inlet end 61, the slurry falls down the outlet conduit and impinges on a 20 to 40°, preferably 30 to 35° bend or elbow 63. This bend 63, as well as the outlet 62 of the outlet conduit 60 located at the end of the bend 63, are located at the bottom of the tank 12 in an outlet chamber or sand gate box 73. The chamber or sand gate box 73 has an outlet 74 which is in flow communication with a slurry inlet of an adjacent flotation cell (not shown). The chamber 73 is also in flow communication with the outlet end 62 of the outlet conduit 60. Finally, the chamber 73 has a sediment or sand inlet opening 75 that is selectively sealable by a closure in the form of a sand gate 70. The inlet opening 75, and hence the sand gate 70, is located adjacent an area of the tank 12 that is prone to the accumulation of sand. The chamber 73 is therefore located in an operatively lower zone of the tank 12, and when the gate 70 is opened, it will be possible for sediment or sand in the operatively lower zone of the tank 12 to be displaced into the chamber 73, from where it will be conveyed with the slurry from the outlet conduit 60 to the adjacent flotation cell (not shown).

The location and orientation of the outlet end 62 of the outlet conduit 63 in the chamber 73 will result in the formation of a low pressure zone immediately behind the bent section, and thus at the inlet 75 of the chamber 73. This is due to the outlet 62, in combination with the position and orientation of the bent section 63, causing a venturi-like draft to develop in the sand gate box 73. This will then result in sediment or sand being drawn from the sand gate region into the chamber or sand gate box 73, from where it is then displaced to the next cell.

The closure or sand gate 70 is positioned immediately before the chamber or sand gate box 73, and the purpose of the sand gate 70 is to enable regulation of the displacement of sand at the bottom of the tank from one cell to the next. The sand gate 70 would normally be slightly open (for example between 5 and 20%) to allow for the constant flow of sediment/sand from the tank 12. However, sand can easily accumulate and block the sand gate 70, and the immediate symptom of such an occurrence will be for water surface level in the tank 12 to rise. The sand gate 70 is able to address this issue by automated opening and closing via an ultrasonic sensor or float sensor (not shown) that actuates a drive means 72 when a high fluid level is detected. The drive opens the sand gate 70 by displacing a sand gate connector 71 that is secured to the sand gate 70. Once the sand has been cleared the sensor will detect the concomitant reduction in fluid level, and the sand gate 70 will be at least partially closed again. This very important improvement therefore prevents the buildup of sand inside the tank, and significantly reduces maintenance downtime.

In an alternative control philosophy, there is provided for a desired level set point to be determined, and for the actual level of the slurry to be measured relative to the desired level. A control signal is then generated, and the sand gate is opened or closed in response to said control signal. In this case the sand gate will be used as a continuous control valve that defines the actuator in a feedback control loop.

It will be appreciated that the above is only one embodiment of the invention, and that there may be many variations without departing from the spirit and/or the scope of the invention.

The invention claimed is:

1. A froth flotation cell comprising:
a tank having an operatively lower zone, an intermediate zone, and an operatively upper zone;
a disperser disposed in the intermediate zone of the tank;
a slurry inlet located in the operatively lower zone of the tank;
a foam outlet positioned near the operatively upper zone of the tank, the foam outlet in flow communication with a foam chamber, an intake portion of the foam outlet positioned at a first height relative to a bottom of the tank;
a slurry outlet conduit having an intake end positioned near the operatively upper zone of the tank at a second height relative to the bottom of the tank, less than the first height, the slurry outlet conduit having an outlet end that is in flow communication with a slurry outlet; and
a gate operable to at least partially block a passage between the operatively lower zone of the tank and the slurry outlet, the gate configured to open, thereby providing a bypass for material to flow from the operatively lower zone of the tank, through the passage, and toward the slurry outlet.

2. The froth flotation cell of claim 1, wherein the slurry outlet conduit extends downwardly along a side of the tank.

3. The froth flotation cell of claim 2, wherein the slurry outlet conduit is configured in order for the first end of the slurry outlet conduit to act as a tank overflow.

4. The froth flotation cell of claim 3, wherein the second height of the intake end of the slurry outlet conduit is adjustable in order for an effective take-off level of the slurry outlet conduit to be adjustable.

5. The froth flotation cell of claim 4, wherein the second height of the intake end of the slurry outlet conduit is increased by securing one or more extension rings to the first end.

6. The froth flotation cell of claim 2, wherein the slurry outlet conduit defines a bent section near the outlet end.

7. The froth flotation cell of claim 6, wherein the bent section defines the outlet end of the slurry outlet conduit.

8. The froth flotation cell of claim 1, wherein:
the passage is defined by an outlet chamber; and
the outlet chamber includes an outlet opening defining the slurry outlet through which slurry received via the slurry outlet conduit is conveyed to a further conduit that is in flow communication with an adjacent flotation cell.

9. The froth flotation cell of claim 1, further comprising a level detection device for use in generating signals for opening and closing the gate.

10. A method for operating a froth flotation cell, comprising:
receiving a slurry mixture at a slurry inlet located at a lower zone of a tank;
dispersing air into the slurry mixture using a disperser disposed in an intermediate zone of the tank, the slurry mixture separating into a slurry portion, a foam portion, and a sediment portion;
receiving the foam portion into a foam outlet from an upper zone of the tank;
receiving the slurry portion into a first end of a slurry outlet conduit from the upper zone of the tank;
directing, using the slurry outlet conduit, of the slurry portion toward a slurry outlet that is positioned near the lower zone of the tank; and
directing, using an outlet chamber, the sediment portion of the slurry mixture from the lower zone of the tank toward the slurry output through a gate positioned at the lower zone of the tank; and
directing the slurry portion and the sediment portion out of the froth flotation cell through the slurry output.

11. The method of claim 10, wherein,
the gate is operable to move between a closed state and an open state; and
the flow of material is provided while the gate is at between 5% and 20% of the open state.

12. The method of claim 10, wherein the gate is opened in response to receiving a signal from a level detection device indicating that a fluid level in the tank is above a threshold.

13. The method of claim 12, wherein:
the signal is a first signal; and
the method further comprises at least partially closing the gate in response to receiving a second signal from the level detection device indicating that the fluid level is below the threshold.

14. The method of claim 10, wherein the slurry outlet conduit includes a second end that is positioned at the slurry outlet.

15. A froth flotation cell comprising:
a tank having a lower zone and an upper zone;
a slurry inlet configured to provide a slurry mixture to the lower zone of the tank;
a disperser configured to introduce air to the slurry mixture, the slurry mixture separating into a foam portion, a slurry portion, and a sediment portion;
a foam outlet positioned near the upper zone of the tank and configured to direct the foam portion of the slurry mixture into a foam chamber;
a slurry outlet positioned near the operatively lower zone of the tank and configured to direct the slurry portion and the sediment portion of the slurry mixture out of the froth flotation cell;
a slurry outlet conduit having a first end configured to receive the slurry portion from the upper zone of the tank, the slurry outlet conduit configured to deliver the slurry portion to a slurry outlet;
a passage defined between the lower zone of the tank and the slurry outlet and configured to provide a bypass flow to direct the sediment portion of the slurry mixture from the lower zone toward the slurry outlet; and
a gate operable to control an amount of the bypass flow through the passage.

16. The froth flotation cell of claim 15, wherein:
the froth flotation cell further comprises a sand gate box;
the passage is defined, at least in part, by the sand gate box; and
the gate is positioned at an inlet to the sand gate box.

17. The froth flotation cell of claim 15, wherein:
the slurry outlet conduit extends along the height of the tank; and
the slurry outlet conduit has a second end that delivers the slurry portion to the slurry outlet.

* * * * *